March 13, 1951 C. G. JOHNSON 2,545,359

AUTOMATIC PHONOGRAPH

Filed March 31, 1945 2 Sheets-Sheet 1

INVENTOR.
Carl G. Johnson
BY John F. Eakin
ATTORNEY

March 13, 1951 C. G. JOHNSON 2,545,359

AUTOMATIC PHONOGRAPH

Filed March 31, 1945 2 Sheets-Sheet 2

INVENTOR.
Carl G. Johnson
BY John F. Eakins
ATTORNEY

Patented Mar. 13, 1951

2,545,359

UNITED STATES PATENT OFFICE 2,545,359

AUTOMATIC PHONOGRAPH

Carl G. Johnson, Chicago, Ill., assignor to J. P. Seeburg Corporation, Chicago, Ill., a corporation of Illinois Application March 31, 1945, Serial No. 585,902

5 Claims. (Cl. 274—10)

This invention relates to automatic phonographs of the general type in which one or more escapement mechanisms support a stack of records for release individually for reproduction seriatim and particularly relates to improvements in the escapement mechanisms.

The escapement mechanisms comprise in general a shelf which supports the records and a blade which is adapted, on actuation of the escapement mechanism, to enter the stack above the lowermost record, after which the shelf clears the lowermost record allowing it to escape.

In Patent No. 2,292,564, issued to me on August 11, 1942, I have described and claimed an escapement mechanism including a member adapted to be engaged by a record of smaller size in the lowermost position of the stack and means associated with this member arranged, when the member is thus actuated, to move upwardly so as to elevate a record of larger size in the second position from the bottom of the stack so that the blade is able to enter the stack without engaging this record of larger size even in the event that it is "mushroomed" so that its edge extends below the level of the lowermost record of smaller size. The elevating members were generally oval shaped and were pivoted below the level of the shelf. In their normal position they were below the level of the shelf but were swung about their pivots upwardly so as to elevate a larger record in the second position from the bottom of the stack. The member arranged to be engaged by the periphery of a record of smaller size was resiliently supported so that a record of larger size in the lowermost position merely moved it down below level of the shelf.

In my copending application Serial No. 576,931, filed February 9, 1945, I have described and claimed a similar mechanism in which the elements having the function of raising a larger record in the second position from the bottom of the stack also had the function of clutching and declutching the escapement head to an actuable member associated therewith.

In the case of one head the record elevating mechanism responded differently to records of different sizes so that in the case of one size of record in the lowermost position the escapement head was declutched and in the case of a record of another the escapement was clutched to the actuable mechanism. In another of the escapement heads the record elevating mechanism was arranged to declutch the escapement head from an actuating mechanism when a record of any size was in the lowermost position. When no record was on the shelves this escapement head was clutched to the actuated mechanism so as to effect the stopping of the phonograph.

In the case of the aforesaid application also, the members which engage a record of larger size to elevate it were generally oval and arranged to be swung about pivots below the level of the shelf. In both cases the movement of the elevating means into operating position was accompanied by a sliding movement over the under surface of the record of larger size. Consequently in the case of soft records and particularly where the stack was heavy there is danger of injury to the recorded surface of the larger record engaged by the elevating means.

The principal object of the invention is to provide improved record elevating means in which the possibility of this injury to the records is completely obviated.

A further object of the invention is to provide an improved escapement mechanism in which a record of larger size in the second lowermost position is elevated by non-sliding movements of elements having a relatively large engaging surface.

Other objects, advantages and capabilities of the invention will appear from the following description of preferred embodiments thereof, taken in conjunction with the accompanying drawings, in which.

Figure 1:
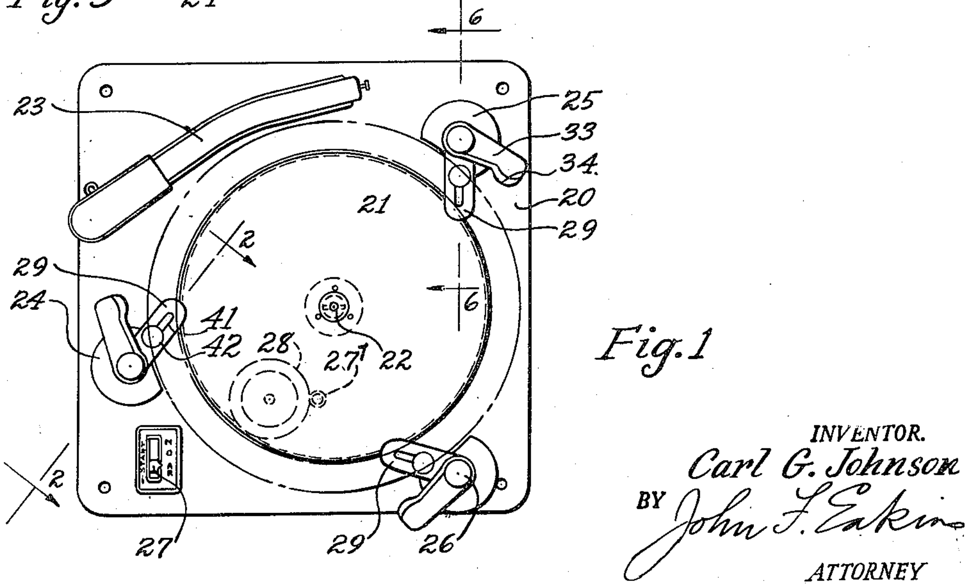
Fig. 1 is a plan view of an automatic phonograph embodying the invention.

Referring to Fig. 1 the phonograph comprises a motor board 20, a turntable 21 having a relatively long central spindle 22, a player arm 23 and three escapement mechanisms 24, 25 and 26. The turntable 21 is driven by a motor (not shown) by means of friction wheels 27′ and 28. To put the machine into operation a stack of records is placed upon the escapements 24, 25, and 26, the spindle 22 extending through their central openings. The control button 27 is moved downwardly from the "off" to the "reject" position and is then manually released so that it moves to the "automatic" position. Movement of the button 27 to "reject" position trips the mechanism so that the escapements 24, 25 and 26 are oscillated to drop the lowermost record onto the turntable and the player arm 23 is moved into initial playing position for the reproduction of the dropped record. At the end of the playing of this record the mechanism is tripped so that the player arm 23 is moved outwardly, the escapements are actuated to drop the next record and the player arm is moved inwardly to initial playing position on that record. This operation is repeated until all the records of the stack have been played, whereupon the mechanism is again tripped, the escapements are actuated and the player arm 23 is locked in its outermost position as shown in Fig. 1. During this operation the escapement 24 controls the return of the player arm for records of different sizes and the escapement 25 opens the control switch during its actuation after the last record has been reproduced.

Apart from the mechanism of the escapement heads the machine may be constructed in the manner fully described in the copending application above referred to which is hereby incorporated by reference.

Referring to Figs. 2 to 5, which illustrate the escapement mechanism 24, this mechanism includes a lower supporting shelf 29 which is in the form of a hollow housing rigidly secured to a vertical sleeve 30. The sleeeve is mounted for free rotation in a standard 31 carried by the motor board 20. At its lower end the sleeve 31 rigidly carries a pinion 32 whereby the escapement may be actuated simultaneously with the other escapements. The shelf 29 supports the upper blade 33, the edge 34 of which is spaced above the upper surface of the shelf 29 by a distance approximately the thickness of a smaller record. The blade 33 is mounted by means of its boss 35 on a pin 36 which is carried by the shelf 29. A spring 37 which abuts against a washer 38 carried at the upper end of the pin 36 and against a shoulder on the boss 35 resiliently biasses the blade 33 downwardly. The blade 33 carries one or more wedge-shaped projections 39 which are received in openings 40 on the boss of the shelf 29. The openings 40 and wedge-shaped projections 39 have sloped engaging surfaces so arranged that if the blade 33 abuts against the edge of a record the blade lags behind the shelf 29 slightly and simultaneously moves upwardly to a slight extent until the edge 34 of the blade 33 has climbed into register on the top surface of the lowermost record whereupon, the blade 33 enters the stack. The spring 37 in cooperation with the engaging inclined surfaces of the projections 39 and the openings 40 causes the blade 33 to resume its normal position when the lowermost record becomes disengaged therefrom.

It may here be noted that in the normal operation of the machine the shelves 29 and the blades 33 normally have their positions shown in Fig. 1. It will be seen that a stack of records may be applied to the spindle 22 and that they will rest on the shelves 29. When the escapements are actuated, they are oscillated in the clockwise direction and then in the counterclockwise direction. The clockwise movement brings the blades 33 into the stack of records above the lowermost record and continued movement in this direction carries the shelves 29 clear of the stack so that the lowermost record falls. The return movement of the escapement heads returns the shelves 29 below the stack and thereafter the blades 33 move clear of the stack so that the stack drops down on to the shelves 29. As explained in the application referred to above the escapements may be swung out of the path of the records on the turntable by manual operation of one of the escapements so that the records may be removed from the turntable by vertical movement. The escapements may be returned to their normal position either manually or by actuation of the trip.

Figures 2, 3, 4, 5:
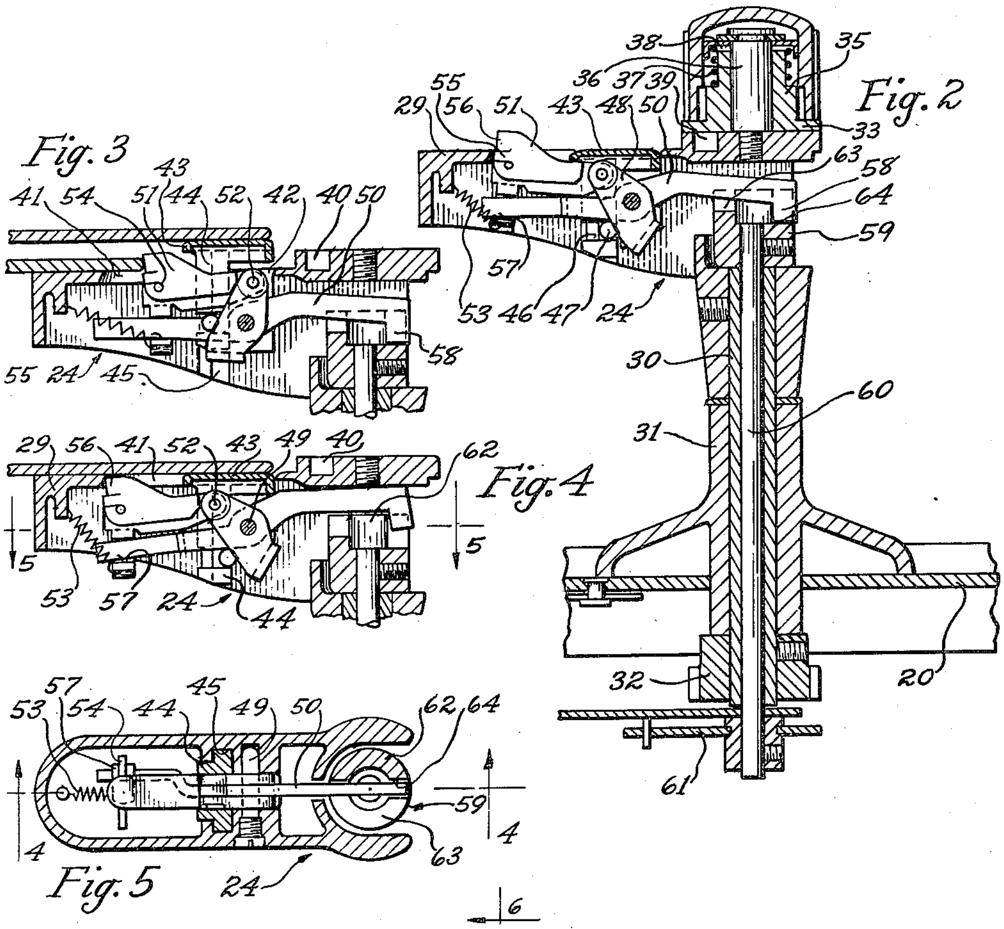
Fig. 2 is a sectional elevation through one escapement mechanism, the section being taken on the line 2—2 of Fig. 1.
Fig. 3 is a fragmentary sectional elevation showing the upper portion of Fig. 2 with the elements actuated by a smaller record in the lowermost position and elevating a larger record in the position immediately above.
Fig. 4 is a sectional view similar to Fig. 3 showing the elements in the position into which they are moved by a record of larger size.
Fig. 5 is a sectional detail plan view taken on the line 5—5 of Fig. 4.

Again referring to Figs. 2 to 5 each shelf 29 is provided with a radial slot 41 in its upper web which slot extends into a circular opening 42. The opening 42 normally receives the record elevating member 43 with its upper surface normally flush with the upper surface of the shelf 29 as shown in Fig. 2. The elevating member 43 may consist of a button or disc with curved edges which carries two downwardly extending slides 44 which are guided vertically in formations 45 in the shelf 29. The slides 44 are provided on the inner sides with horizontal slots 46 which receive projections 47 carried by and extending outwardly from the legs of a U-shaped member 48. The U-shaped member 48 is pivotally mounted by means of a horizontal pin 49 which is screwed into the housing of the shelf 29 in a horizontal position. A lever 50 which extends between the legs of the U-shaped member 48 is also pivotally mounted by means of the pin 49. An actuating member 51 is pivotally connected to the upper ends of the legs of the U-shaped member 48 by means of a pivot pin 52. The member 51 is biassed outwardly and upwardly by means of a spring 53 which is connected to the outer end of the shelf 29 and to a low point on the member 51. A pin 54 which extends through the member is arranged to engage the underside of the shelf 29 so as to limit the upward movement of the member 51. A portion 55 of the member 51 normally rides in the slot 41. In the normal position of the member 51, as shown in Fig. 2, a record contacting portion 56 of the member 51 projects above the upper surface of the shelf 29. The outer end of the lever 50 extends freely through an eye 57 on a lower part of the member 51. The inner end of the lever 50 is provided with a downwardly extending tail or detent 58 which cooperates with a clutch member 59. The clutch member 59 is rigidly mounted on the upper end of a rod 60 which extends through the sleeve 30. The detent 58 is a complementary clutch member for the clutch member 59. At its lower end the rod 60 rigidly carries a cam 61 which is part of the mechanism for setting the player arm for a record of certain size. The clutch member 59 is provided with a high side 62, a low side 63 and a still lower recess 64 which normally receives the detent 58 as shown in Fig. 2.

When the escapement 24 is in normal position and the record of smaller size is lowermost in the stack, that record is supported by the shelf 29 outwardly of the contact 56. When the escapement 24 is actuated to drop this lowermost record of smaller size the contact 56 engages the periphery of the record of smaller size and the member 51 is moved towards the axis of the escapement in the manner shown in Fig. 3. The U-shaped member 48 is consequently swung in clockwise direction and its projections 47 swing upwardly carrying the slides 44 and the record elevating member 43 with it. Consequently if the next highest record is of larger size, it together with the rest of the stack is raised upwardly as shown in Fig. 3 so that the blade 33 cannot by any possibility engage this record of larger size. The blade 33 moves in below the record of larger size and if this edge 34 engages the lowermost record the blade is elevated until it can pass into the stack above the lowermost record. The eye 57 moving in a horizontal direction does not affect the lever 50 so that its detent remains seated in the recess 64. Consequently the clutch member 59 is carried with the escapement 24 during its oscillation and the cam 61 is actuated to effect the initial setting of the player arm for a record of smaller size. It is to be noted with reference to Fig. 5 that the outer end of the lever 50 and the eye 57 are displaced from the center line to permit the spring 53 to be located on this line.

When a record of larger size rests on the shelf 29 the member 51 is depressed as shown in Fig. 4 by pivotal movement about the pin 52 against the tension of the spring 53. The downward movement of the eye 57 swings the lever 50 about the pin 49 so that its detent 58 is elevated out of the recess 64 into a position above the lower side 63 of the clutch member 59. As shown in Fig. 4 the part of the lever 50 adjacent the detent 58 is elevated above the high side 62 of the clutch member 59. Consequently during the first movement of the shelf 29 the detent 58 rides freely over the surface 63 and the clutch member 59 and cam 61 are not actuated with the result that the player arm is located for the initial playing position of a record of larger size. It is to be noted that the detent 58 is always in the path of the high side 62 of the clutch member 59 so that the clutch member 59 is automatically returned from any abnormal position by a record changing cycle.

The escapement 25 is illustrated in detail in Figs. 6 to 10. In this embodiment the lever 50 is omitted and the member 51 is provided with a tail or inner end 65 which cooperates with a clutch member 66, and the eye 57 is omitted. The tail 65 serves as a complementary clutch member for the clutch member 66. The tail 65 is connected to the member 51 by means of an enlarged portion 67 which is provided with an arcuate slot 68 through which the pin 49 passes. In normal condition the contact 56 of the member 51 projects above the upper surface of the shelf 29. When this contact engages the periphery of a record of smaller size the member 51 is bodily displaced to the right from its position in Fig. 6 into its position in Fig. 7. This moves the pin 52 to the right and swings the U-shaped member 48 in clockwise direction so that its projections 47 move upwardly moving the record elevating member 43 upwardly so as to elevate a record of larger size immediately above the lowermost record in the manner shown in Fig. 7 and in manner identical with that of the previously described embodiment. Displacement of the pin 52 towards the right about the pivot 49 raises the pin 52 so that the tail 65 of the member 51 is elevated out of a recess 69 in the clutch member 66.

Figures 6, 7, 8, 9, 10:
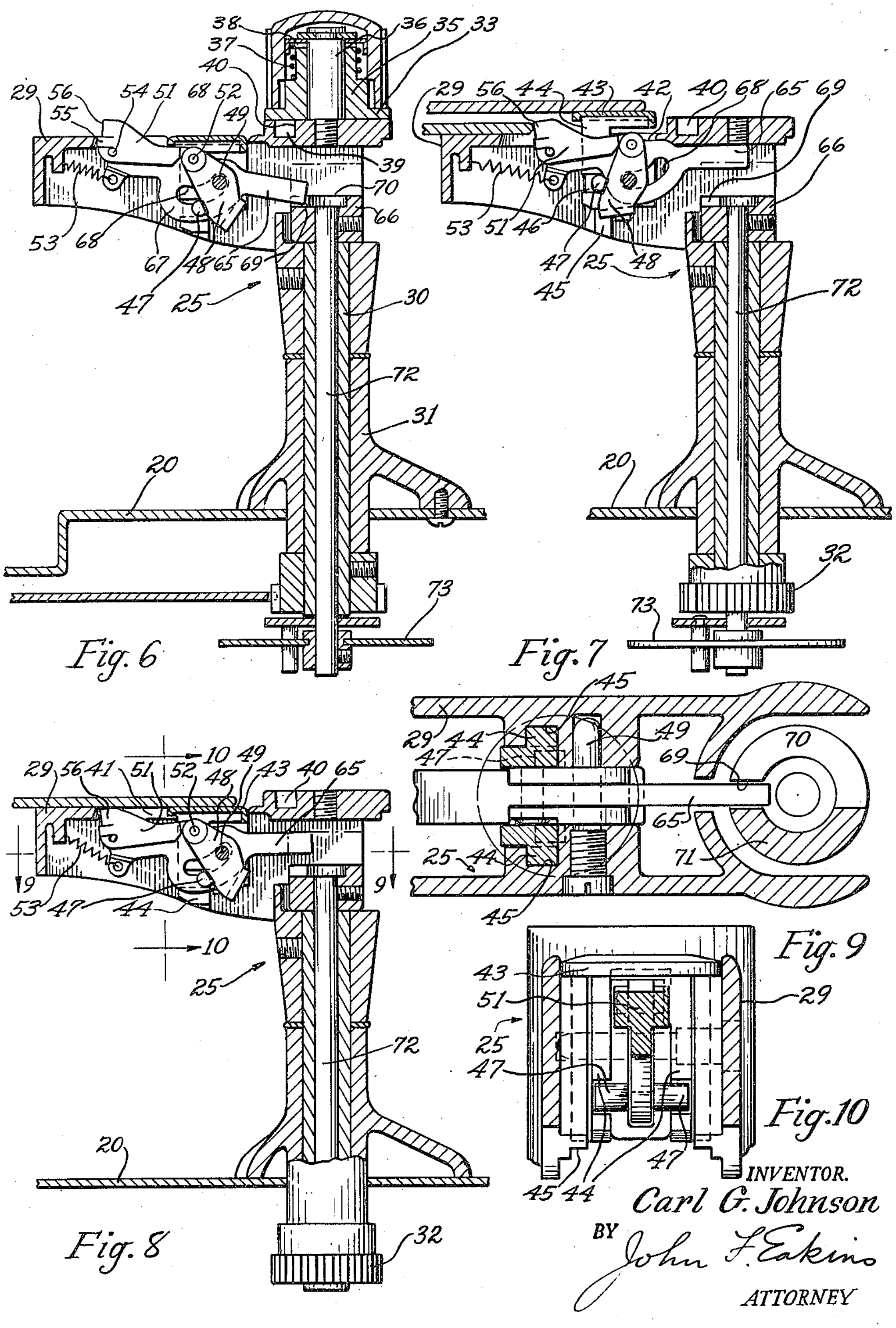
Fig. 6 is a sectional elevation through another escapement mechanism, the section being taken on the line 6—6 of Fig. 1.
Fig. 7 is a similar view showing the manner in which this escapement cooperates with a record of smaller size in the lowermost position to elevate a record of larger size immediately above it.
Fig. 8 is a similar view showing the manner in which the escapement cooperates with a record of larger size in the lowermost position.
Fig. 9 is a fragmentary sectional detail on a larger scale taken on the line 9—9 of Fig. 8.
Fig. 10 is a vertical sectional detail on a similar larger scale taken on the line 10—10 of Fig. 8.

When a record of layer size is on the shelf 29 the contact 56 of the member 51 is depressed as shown in Fig. 8, by swinging movement about its pivot 52. The U-shaped member 48 is not actuated so that the record elevating member 43 is not actuated. The tail 65 of the member 51 is however elevated out of the recess 69 owing to the bodily movement of the member 51 about its pivot 52. It is to be noted that the member 66 is provided with a low side 70 and a high side 71. The clutch member 66 is rigidly mounted at the upper end of a rod 72 similar to the rod 60 and at its lower end it rigidly carries a cam 73. This cam when actuated conditions the machine for automatic termination of operation of the motor at the end of a record changing cycle with no record on the escapements, in the manner fully described in the copending application referred to. It will be noted from Figs. 7 and 8 that the clutch member 66 is not actuated when there is a record on the escapement. When there is no record on the escapement the tail 65 is located in the recess 69 so that the cam 73 is actuated. It is to be noted that the tail 65 never rises above the high side 71.

The escapement 26 may be substantially similar to the escapement 25. Since this escapement is not required to actuate any clutch member the tail 65 and if desired the portion 67 may be omitted. Or the escapement 26 may be similar to the escapement 24 with the omission of the lever 50 and in this event the eye 57 need not be provided on the member 51. Actually it is preferred to use parts of either of the two escapements since that avoids the production of an extra part. In any event the escapement 26 operates with respect to the elavation of a record of larger size in exactly the same manner as do the other two escapements.

It is to be noted that in the case of all the escapements a record of larger size is elevated by the vertical movement of the relatively large members 43 and that these members have no slipping engagement with the elevated record.

Although the invention has been described in connection with the specific details of a preferred embodiment thereof, it must be understood that such details are not intended to be limitative of the invention except in so far as set forth in the accompanying claims.

Having thus described my invention, I declare that what I claim is:

1. An escapement for automatic phonographs comprising an arm normally supporting a stack of records, a blade above said arm adapted to enter said stack above the lowermost record of the stack, said escapement being arranged for bodily movement to bring said blade into the stack and thereafter to bring the arm clear of the stack to release said lowermost record, a record elevating member on said arm, guide means on said arm for preventing movement of said elevating member except in a direction normal to the planes of the records of said stack, an actuating member on said arm adapted to engage and be displaced horizontally by a record of smaller size resting on said arm, and means operatively connecting said actuating member and said elevating member to effect projection of said elevating member, said elevating member being located clear of the lowermost record of smaller size and below a record of larger size in the next higher position, whereby said record of larger size is elevated clear of the record of smaller size before the blade moves into the stack.

2. An escapement for automatic phonographs comprising an arm normally supporting a stack of records, a blade above said arm adapted to enter said stack above the lowermost record of the stack, said escapement being arranged for bodily movement to bring said blade into the stack and thereafter to bring the arm clear of the stack to release said lowermost record, a record elevating member on said arm, guide means on said arm for preventing movement of said elevating member except in a direction normal to the planes of the records of said stack, an actuating member on said arm adapted to engage the periphery of a record of smaller size in the lowermost position of the stack and to be displaced horizontally thereby, and means operatively connecting said actuating member and said elevating member to effect projection of said elevating member, said elevating member being located clear of the lowermost record of smaller size and below a record of larger size in the next higher position, whereby said record of larger size is elevated clear of the record of smaller size before the blade moves into the stack.

3. An escapement for automatic phonographs comprising an arm normally supporting a stack of records, a blade above said arm adapted to enter said stack above the lowermost record of the stack, said escapement being arranged for bodily movement to bring said blade into the stack and thereafter to bring the arm clear of the stack to release said lowermost record, a record elevating member on said arm, guide means on said arm for preventing movement of said elevating member except in a direction normal to the planes of the records of said stack, a contact on said arm normally out of alignment with the records of smaller size in the stack and in alignment with records of larger size in the stack, means biassing said contact upwardly above the surface of the arm whereby it may be depressed by a record of larger size in the lowermost position of the stack and it may engage and be displaced horizontally by the periphery of a smaller record in the lowermost position of the stack, and means interconnecting said contact and said elevating member whereby said elevating member is projected by the displacement of the contact to effect the elevation of a record of larger size in the next higher position of the stack clear of a record of smaller size in the lowermost position of the stack before the blade enters the stack.

4. An escapement for automatic phonographs comprising an arm normally supporting a stack of records, a blade above said arm adapted to enter said stack above the lowermost record of the stack, said escapement being arranged for bodily movement to bring said blade into the stack and thereafter to bring the arm clear of the stack to release said lowermost record, a record elevating member on said arm, guide means on said arm for preventing movement of said elevating member except in a direction normal to the planes of the records of said stack, a contact on said arm normally out of alignment with the records of smaller size in the stack and in alignment with records of larger size in the stack, means biassing said contact upwardly above the surface of the arm whereby it may be depressed by a record of larger size in the lowermost position of the stack and it may engage and be displaced horizontally by the periphery of a smaller record in the lowermost position of the stack, and a lever pivotally mounted on said arm and adapted when actuated to effect projection of said elevating member, said lever being operatively associated with the contact so that it is actuated when the contact is displaced by a record of smaller size whereby a record of larger size in the next higher position of the stack is elevated clear of the lowermost record of smaller size before the blade enters the stack.

5. An escapement for automatic phonographs comprising an arm normally supporting a stack of records, a blade above said arm adapted to enter said stack above the lowermost record of the stack, said escapement being arranged for bodily movement to bring said blade into the stack and thereafter to bring the arm clear of the stack to release said lowermost record, a record elevating member on said arm, guide means on said arm for preventing movement of said elevating member except in a direction normal to the planes of the records of said stack, a contact on said arm normally out of alignment with the records of smaller size in the stack and in alignment with records of larger size in the stack, means biassing said contact upwardly above the surface of the arm whereby it may be depressed by a record of larger size in the lowermost position of the stack and it may engage and be displaced horizontally by the periphery of a smaller record in the lowermost position of the stack, and a lever pivotally mounted on said arm and adapted when actuated to effect projection of said elevating member, said lever being pivotally connected to said contact so that the lever is swung when the contact is displaced by a record of smaller size whereby a record of larger size in the next higher position of the stack is elevated clear of the lowermost record of smaller size before the blade enters the stack.

CARL G. JOHNSON.

REFERENCES CITED

The following references are of record in the file of this patent:

UNITED STATES PATENTS

| Number | Name | Date |
|---|---|---|
| 2,292,564 | Johnson | Aug. 11, 1942 |